May 22, 1962

S. S. ROMANO 3,036,158

BINAURAL VOLUME TUNER

Filed Sept. 25, 1957

INVENTOR:
SAM S. ROMANO
BY
Watson D. Harbaugh
ATT'Y 3,036,158

BINAURAL VOLUME TUNER

Sam S. Romano, Northlake, Ill., assignor to Webcor, Inc., Chicago, Ill., a corporation of Illinois Filed Sept. 25, 1957, Ser. No. 686,170
5 Claims. (Cl. 179—1)

Figure 1:
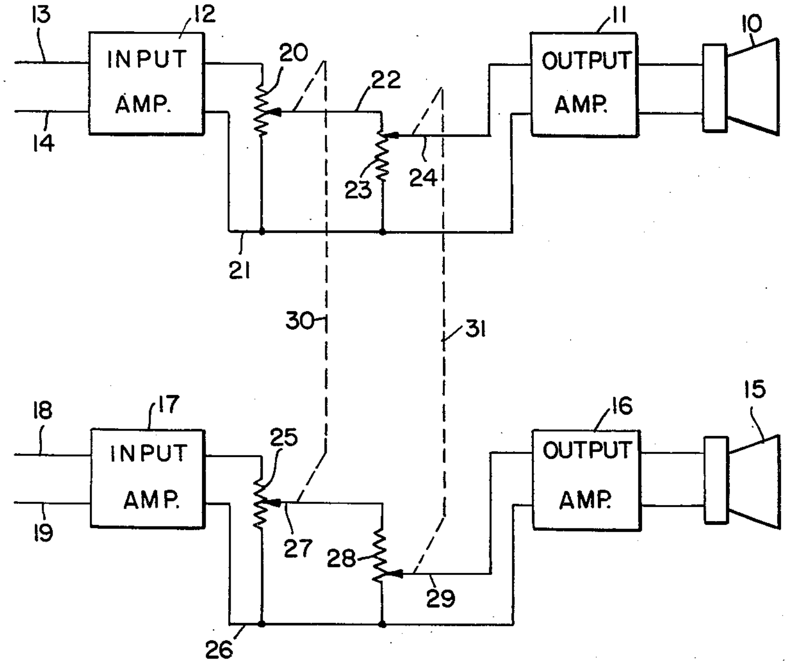

This invention relates to a volume control for adjusting the respective output volumes of a plurality of audio amplifiers and the speakers associated therewith, and more particularly to a binaural volume control for a pair of audio amplifiers whereby the relative volumes thereof may be selectively adjusted to provide the most pleasing combination.

High fidelity record reproduction systems are presently coming into extensive use and, as is well known, such systems ordinarily employ at least a pair of separate speakers and individual amplifiers associated therewith. If desired, one such speaker and the amplifier circuit therefor is designed to reproduce the higher tonal frequencies, those within the soprano range for example; and the other such speaker and its amplifier is used for reproducing the lower tonal frequencies. With systems of this type, the recorded reproduction more nearly approaches the true tonal combinations of the orchestra as those combinations are actually recorded.

In order that the purposes of these systems be realized, it is necessary to adjust the relative output volume of each speaker so that they are heard individually, but in an interrelationship such that one does not ordinarily overpower the other. It will be appreciated that this has necessitated individual control of the output volume of each speaker; but since the speakers are spaced from each other, it is extremely difficult to properly adjust the individual outputs thereof, and any particular adjustment is for the most part fixed for one predetermined position of the listener. Therefore, if the proximity of a listener relative to each speaker is changed, it is necessary to again adjust the volume intensities of the speakers accordingly. In view of this, it is apparent that it is almost impossible to accurately adjust the relative volume intensities of the speakers when the volume controls have a fixed location, for then the listener can only guess the correct adjustment for any position other than that at which the volume controls are located.

An improved means for adjusting the intensity of the output volumes of a plurality of amplifiers and their speakers is needed in the art, and it is accordingly an object of this invention to provide such an improvement. Another object of the invention is that of providing a volume control arrangement for selectively adjusting the intensity of a plurality of speaker volumes, and which comprises a remote, portable volume control unit whereby the listener can adjust the volumes at a location he selects.

Still another object of this invention is to provide a binaural volume control that enables a listener to adjust the relative volume intensities of a pair of speakers through a single control which affords precision adjustment of such volumes. Yet a further object is in the provision of a volume control system for a pair of individual amplifiers, that utilizes a substantially conventional volume control arrangement whereby the volumes of the amplifiers are increased and decreased equally and simultaneously through a single adjustment; and which incorporates also a binaural volume control whereby the relative volumes of the amplifiers are adjusted simultaneously through a single control, but in a relationship such that the volume of one is decreased while that of the other is increased, and vice versa. Additional objects and advantages of the invention will become apparent as the specification develops.

Figure 2:
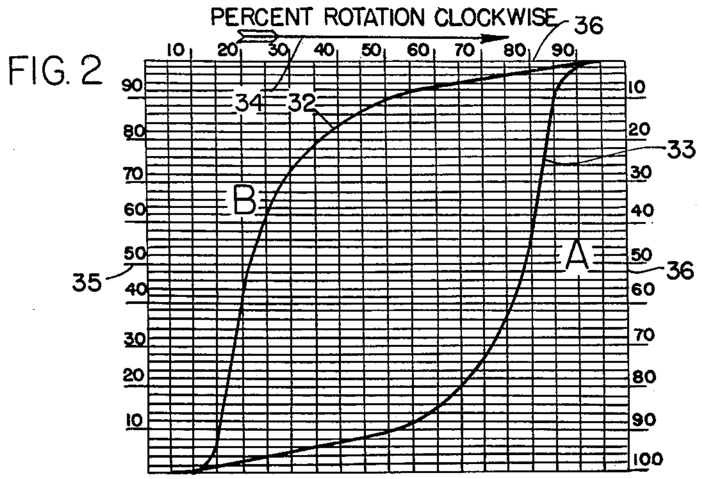

An embodiment of the invention is illustrated in the accompanying drawing, in which:

FIG. 1 is a schematic diagram illustrating the binaural volume control of this invention, incorporated in a reproduction system employing a pair of individual speakers and their associated amplifier circuits; and FIG. 2 is a graph showing the volume output of the resistances and voltage ratios as controlling volume output of the speakers relative to rotation of a single knob control.

The volume control of this invention may be employed with conventional reproduction systems with relatively low impedance outputs, and since such systems are now well known in the art, the partial illustration thereof in FIG. 1 is in diagrammatic form which is adequate for purposes of describing the instant invention. It is apparent that FIG. 1 shows a speaker 10 connected to an output amplifier 11 which receives signals from a prior stage 12 that may be an input or preamplifier. Signals are fed to the stage 12 through leads 13 and 14 which ultimately, perhaps through additional stages, are connected to any input source such as the pick-up head of a record player. FIG. 1 also shows a speaker 15 connected to an output amplifier 16 that receives signals from a prior stage 17, which again may be an input amplifier that in turn receives its signals through leads 18 and 19 which are coupled to any input source such as the reproduction head of the same phonograph.

The speaker 10 and associated amplifiers 11 and 12 are designed to accommodate any electrical impulse signals within one predetermined frequency range as, for example, low frequency oscillations or bass tones. Similarly, the speaker 15 and its amplifiers 16 and 17 will be designed to accommodate signals within another portion of the range as, for example, soprano tones. It will be apparent that some overlapping of the tonal ranges will be provided in the system so that predetermined electrical impulses or oscillations will be captured and reproduced. The input stage 12 is provided with a potentiometer 20 in the outlet thereof which is connected at one end to a ground wire 21. The adjustable tap 22 of the potentiometer 20 is connected to one side of a potentiometer 23, which has its other side connected to the ground wire 21 and its adjustable tap 24 connected to and providing the input for the amplifier 11.

An identical arrangement is provided between the stages 16 and 17 with a potentiometer 25 having one side thereof connected to the common or ground wire 26, and its adjustable tap 27 connected to the ground wire 26 through a potentiometer 28 having an adjustable tap 29 feeding into the output amplifier 16. The adjustable taps 22 and 27 are mechanically coupled, as is shown by the dotted lines 30, so that they are simultaneously adjusted through a single control knob. Similarly, the adjustable taps 24 and 29 are mechanically linked, as shown by the broken lines 31 representing a single control knob, with the result that they are simultaneously adjusted through a single control therefor. The potentiometers 20 and 25 are conventional, and the mechanical linkage for the taps 22 and 27 is of standard character—so that an equal change in resistance and volume in corresponding directions is afforded by adjustment thereof. That is to say, at any setting of the linkage 30, the resistance across that portion of the potentiometer 20 defined by the tap 22 thereof, and the resistance across that portion of the potentiometer 25 defined by the tap 27 thereof, will be the same. Therefore, the output volumes of the speakers 10 and 15 are increased and decreased equally to the same extent by adjustment of the linkage 30.

On the other hand, the adjustable taps 24 and 29 of the respective potentiometers 23 and 28 are oppositely arranged with respect to each other so that adjustment of the linkage 31 increases the resistance at the tap 24 while decreasing the resistance at the tap 29, and vice versa. This arrangement is illustrated in FIG. 1 in that the adjustable tap 24 is shown positioned adjacent the zero resistance point along the potentiometer 23, while the adjustable tap 29 is shown positioned at the point of maximum resistance along the potentiometer 28. It will be appreciated that as a result of this, the power output or volume of the speaker 10 will be high while that of the speaker 15 is low.

The graphic representation of the volume control arrangement for the amplifiers is shown in FIG. 2 wherein the taper characteristics of the resistances involved are plotted against the percentage of rotation of the knob which simultaneously controls both resistances. The change in resistance per each degree of rotation exhibits a modified logarithmic curve for both resistances which is substantially identical, but oppositely phased. One is a forward modified log curve and the other is a reverse modified curve.

Orienting the resistances 23 and 28, of FIG. 1 with the curves of FIG. 2, the contacts 24 and 29 in FIG. 1 are indicated in full clockwise position and curve 32 applies to resistance 23 while curve 33 applies to resistance 28 in relationship to the arrow 34 showing direction of clockwise rotation of the knob.

In order to understand the relationship it should be noted that with clockwise rotation curve, 32 indicates an increase in resistance 23 as measured by the scale 35 on the left side of the graph and curve 33 indicates a decrease in resistance 28 as measured by the scale 36 on the right side of the graph.

In mid position, 50% rotation as read along the $x$ axis 36, the output of the two amplifiers are approximately balanced between speakers. Each is operating at approximately 10% of change in resistance for both resistances. From this mid position, the control can be rotated in either direction with one resistance varying over the remaining 90% while the other resistance varies only over 10% change in resistance. Thus at mid position there is a minimum or little loss in overall volume, and rotation in either direction of the control varies the volume for one amplifier rapidly over a wide range while affecting the other amplifier but very little. This is true, but reversely so, for opposite directions of rotation of the knob.

Thus, since the curves 32 and 33 are the exact reversals of each other, the volume at the speaker 10 will increase sharply during a time when the volume at the speaker 15 is decreasing slowly; and similarly, when the volume at the speaker 10 begins to increase slowly for changes in grid voltage, the volume at the speaker 15 is decreasing sharply for corresponding changes in the grid voltage of the amplifier 16. However, along the line 34 which is representative of the points of midsetting for both the taps 24 and 29, the relative volume changes effected by displacement of the taps therefrom are generally similar. In view of this, a slight increase in the volume at the speaker 10 is correlated by a slight decrease in the volume at the speaker 15, and vice versa. On the other hand, the relative change in the volumes becomes progressively greater as the adjustable taps 24 and 29 are moved farther from the center points of the potentiometers 23 and 28.

In operating the system, either the control linkage or knob 30 is first adjusted so as to provide the approximate desired volume for both of the speakers 10 and 15 just as the volume of a conventional radio or record player is adjusted, or the control linkage or knob 31 is first adjusted so as to attain the desired relative volumes at the speakers 10 and 15. Whichever is done first, the other is done next and thereafter the controls can be alternately, or simultaneously used until the operator is satisfied as to results attained. Generally, a main setting and a touch up setting of each control is all that is required.

This is quickly accomplished. The adjustments may be made with precision because of the manner in which the potentiometers 23 and 28 effectuate relative changes in the volumes, as heretofore explained. Further, the potentiometers 23 and 28 as well as the control linkage 31 comprise a remote control unit which may be manipulated by the listener from any location he selects within a room. As a consequence thereof, the tuning of the relative volumes affords exactness in the stereophonic reproduction that duplicates the original orchestral rendition to the extent that the auditory impression is as though the orchestra still was in the room.

The potentiometers 23 and 28 may also be of a special type. Rather than a slight change within 10% in resistance from said pivot rotation to the end of the tap settings such could be a zero change and all change could be allocated to the rotation in the other direction from mid point at least through a portion thereof. With potentiometers of this type, the relative volume adjustments are even more sensitive in the relationship heretofore described. However, it is preferred to have change on both sides of the mid point in both directions of rotation as already described.

While in the foregoing specification an embodiment of the invention has been set forth in considerable detail for purposes of illustration, it will be readily apparent to those skilled in the art that numerous changes may be made in those details without departing from the principles and spirit of the invention.

I claim:

1. In a high fidelity record player, an electrical network reproducing tones having frequencies within a predetermined range of audible frequencies and comprising an audio amplifier and a speaker therefor, a second electrical network reproducing tones having frequencies within another predetermined range of audible frequencies and comprising an audio amplifier and a speaker therefor, each of said networks having a volume control controlling the intensity of the speaker outputs, and each of said networks having a volume control means with like taper characteristics exhibiting a modified logarithmic curve, and means simultaneously adjusting the volume control means for varying the relative intensities of the speaker outputs inversely at different rates.

2. The combination called for in claim 1 in which the volume control and the volume control means to each network have movable signal bearing elements connected electrically in series with each other.

3. In a binaural amplification system of the character described, a network reproducing signals within one range of audio frequencies comprising a speaker equipped output amplifier and an input stage therefor, a second network reproducing signals within another range of audio frequencies and comprising a speaker equipped output amplifier and an input stage therefor, a volume control potentiometer in each of said net works having like taper characteristics exhibiting a modified logarithmic curve and controlling, at a varying rate, the intensity of the signals fed to said amplifiers from the respective input stages therefor, said potentiometers having adjustable taps, control means mechanically coupling said adjustable taps for simultaneous adjustment thereof, and another volume control potentiometer in each of said networks having an adjustable tap further controlling the signal intensities fed to the respective output amplifiers from the input stages therefor, the adjustable taps of the last mentioned volume control potentiometers being mechanically coupled together for simultaneous inverse logarithmic adjustment of said last mentioned potentiometers with respect to each other for increasing the input signal strength to one amplifier while the input signal strength to the other amplifier is being decreased.

4. The apparatus of claim 3 in which said volume control potentiometer with the mechanically coupled taps comprises a remote control unit which is selectively movable.

5. The apparatus of claim 3 in which said volume control potentiometers with the mechanically coupled taps are characterized by resistance change through at least a portion of the range of tap settings that varies in general accordance with a logarithmic function on opposite sides of an intermediate setting where the resistance characteristics are equal.

References Cited in the file of this patent

UNITED STATES PATENTS

| | | |
|---|---|---|
| 1,796,375 | Kent | Mar. 17, 1931 |
| 1,942,068 | Owens | Jan. 2, 1934 |
| 1,973,453 | Whiting | Sept. 11, 1934 |
| 2,074,852 | Nelson | Mar. 23, 1937 |
| 2,126,929 | Snow et al. | Aug. 16, 1938 |
| 2,343,471 | Nixon | Mar. 7, 1944 |
| 2,433,771 | Lindenberg | Dec. 30, 1947 |
| 2,445,031 | McDonald | July 13, 1948 |
| 2,474,191 | Reid et al. | June 21, 1949 |
| 2,481,576 | De Boer | Sept. 13, 1949 |
| 2,778,874 | Mueller | Jan. 22, 1957 |
| 2,822,429 | Watson | Feb. 4, 1958 |